Patented Nov. 7, 1950

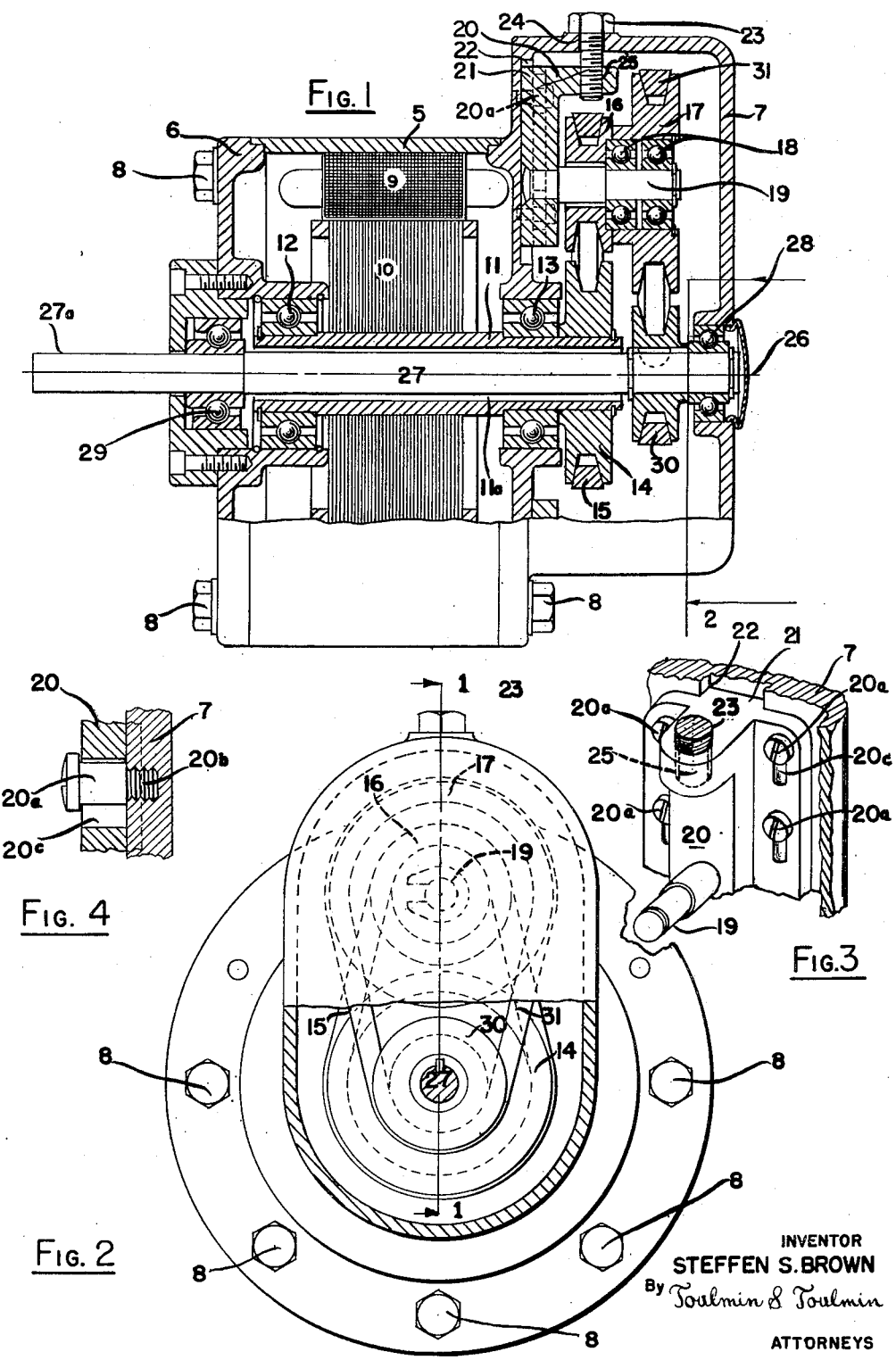

2,528,686

UNITED STATES PATENT OFFICE 2,528,686

MOTOR DRIVE UNIT

Steffen S. Brown, Dayton, Ohio, assignor to The Brown-Brockmeyer Company, Dayton, Ohio, a corporation of Ohio Application July 30, 1948, Serial No. 41,450

2 Claims. (Cl. 74—219)

This invention pertains to improvements in motor drive units and is more particularly directed to a speed change unit in which the output speed of the unit is different from that of the driving motor thereof.

One of the objects of the invention is to provide an improved motor drive unit which has greater flexibility with regard to the output speeds capable of being produced by the unit.

Another object of this invention is to provide a speed change unit for a motor drive device which is quiet in operation.

Still another object of this invention is to provide a speed change unit which is simple and economical to manufacture.

Another object of this invention is to provide in a motor drive unit a change speed transmission which does not require an oil chamber to affect the lubrication of the drive parts.

Still another object of this invention is to provide a V-belt drive mechanism which may be easily serviced by replacing the belts and in which well known stock belts may be utilized.

Still another object of this invention is to provide, in a motor drive unit, an electrical drive motor having a rotor which is hollow and through which is mounted the output shaft of the speed change unit so as to provide easy accessibility to adjustment for changing the speed of the output shaft.

Further features and advantages will appear from the detailed description of the drawings in which:

Figure 1 is a side view of the unit partly in section on the line 1—1 in Figure 2.

Figure 2 is an end view partly in section on the line 2—2 of Figure 1.

Figure 3 is a fragmentary perspective view of the belt tightening mechanism for the V-belt transmission.

Figure 4 is a fragmentary section through one of the clamping screws for the belt tightening mechanism, Figure 3 as indicated by the line 4—4 in said figure.

As illustrative of one embodiment of this invention there is shown a main housing comprising the stator carrying member 5 to which is fixed the output end housing wall 6 and the change speed transmission 7 by suitable bolting means 8. A suitable stator 9 is fixed in the member 5 of the housing inside of which is rotatably mounted the rotor 10 which is fixed on a hollow shaft 11 rotatably journalled on bearings 12 and 13, bearing 12 being in the end wall 6 and bearing 13 being in the intermediate wall of the housing. The shaft 11 projects outwardly through the bearing 13, in the intermediate wall of the housing, and has fixed on it a V-belt pulley 14 over which operates a V-belt 15 which drives another V-belt pulley 16 fixed to a third V-belt pulley 17 both of which pulleys 16 and 17 are journalled as a pair of compound idler pulleys on a suitable bearing 18. The bearing 18 is supported on an adjustable idler stud 19 which is fixed in the sliding belt tightening member 20. The belt tightening member 20 has a tongue 21 which slides in a mating keyway 22 and is adjusted therealong by a belt tensioning screw 23 which passes through a clearance bore 24 in the housing member 7 and is threaded at 25 into the member 20, so that by turning the screw 23 the idler stud 19 may be moved radially of the axis of rotation 26 of the shaft 11 and an output shaft 27. Suitable screws 20a threading at 20b in the housing member 7 passing through elongated slots 20c in the member 20 serve to guide the member 20 to any desired adjusted position on the housing portion 7.

The output shaft 27 passes loosely through the bore 11a of the hollow motor shaft 11 and is journalled on a bearing 28 in the end housing wall member 7 and supported at its output end 27a in the bearing 29 in the end housing wall member 6. A V-belt pulley 30 fixed on the shaft 27 in alignment with the pulley 17 of the idler stud 19 is driven to rotate the shaft 27 by a suitable V-belt 21 operating over the pulleys 17 and 30. Thus by turning the screw 23 so as to draw the member 20 upwardly Figure 1, and therewith the idler stud 19, both of the driving belts 15 and 31 may be properly tensioned in operating relationship on the pulleys 14—16 and the pulleys 17—30. By turning the screw 23 in the opposite direction, and allowing the member 20 to drop downwardly, Figure 1, the center distance of the pulleys may be brought close enough together to allow easy removal and replacement of the driving belts.

It is important to note that in this motor drive unit the power from the roter 10 is transmitted to a hollow shaft 11 which transmits the power to the change speed transmission comprising the V-belt arrangement above described and then the power is applied to an output shaft which passes telescopically through the motor shaft to provide an output end for this shaft on the opposite side of the motor from the V-belt change speed transmission to thus provide complete accessibility to the change speed transmission while the unit has the output end 27a therof at all times connected up to the apparatus being driven by it.

While the apparatus herein disclosed and described constitutes a preferred form of the invention, it is to be understood that the apparatus is capable of mechanical alteration without departing from the spirit of the invention and that such mechanical arrangements and commercial adaptations as fall within the scope of the appendant claims are intended to be included herein.

Having thus fully set forth and described this invention, what is claimed as new and desired to be secured by United States Letters Patent is:

1. A motor drive unit having a housing comprising end walls and an intermediate wall defining two compartments, one of said compartments forming a motor portion and the other a change speed transmission portion, a stator in said motor portion, a rotor associated with said stator, a hollow drive shaft supporting said rotor and journalled in one of the end walls and the intermediate wall, an output shaft passing loosely through the center of said hollow shaft and journalled in the end walls whereby said shafts are independently journalled in said housing so no radial or axial loads can be transmitted therebetween, means for driving said transmission from said hollow shaft and means for driving said output shaft from said transmission, said transmission including a belt tightening member adjustably mounted on said intermediate wall.

2. A motor drive unit having a housing comprising end walls and an intermediate wall defining two compartments, one of said compartments forming a motor portion and the other a change speed transmission portion, a stator in said motor portion, a rotor associated with said stator, bearings in said walls, a hollow drive shaft supporting said rotor and journalled on the bearing in said intermediate wall and one of the bearings in one of the end walls, an output shaft passing loosely through the center of said hollow shaft and journalled on a bearing in said other end wall and on another bearing in said one end wall whereby said shafts are independently journalled in said housing so no radial or axial loads can be transmitted therebetween, means for driving said transmission from said hollow shaft and means for driving said output shaft from said transmission.

STEFFEN S. BROWN.

REFERENCES CITED

The following references are of record in the file of this patent:

UNITED STATES PATENTS

| Number | Name | Date |
|---|---|---|
| 298,291 | Cromie | May 6, 1884 |
| 437,820 | Peck | Oct. 7, 1890 |
| 2,430,798 | Alexander | Nov. 11, 1947 |
| 2,433,150 | Palm | Dec. 23, 1947 |